(12) United States Patent
Zhou

(10) Patent No.: US 11,320,685 B2
(45) Date of Patent: *May 3, 2022

(54) LIQUID CRYSTAL DISPLAY MODULE AND MOBILE TERMINAL

(71) Applicant: WUHAN CHINA STAR OPTOELECTRONICS TECHNOLOGY CO., LTD., Hubei (CN)

(72) Inventor: Yongxiang Zhou, Hubei (CN)

(73) Assignee: WUHAN CHINA STAR OPTOELECTRONICS TECHNOLOGY CO., LTD., Wuhan (CN)

( * ) Notice: Subject to any disclaimer, the term of this patent is extended or adjusted under 35 U.S.C. 154(b) by 295 days.

This patent is subject to a terminal disclaimer.

(21) Appl. No.: 16/623,715

(22) PCT Filed: Sep. 29, 2019

(86) PCT No.: PCT/CN2019/108915
§ 371 (c)(1),
(2) Date: Dec. 17, 2019

(87) PCT Pub. No.: WO2020/232947
PCT Pub. Date: Nov. 26, 2020

(65) Prior Publication Data
US 2021/0341784 A1    Nov. 4, 2021

(30) Foreign Application Priority Data

May 23, 2019 (CN) .......................... 201910433532.7

(51) Int. Cl.
G02F 1/1333 (2006.01)
G02F 1/1335 (2006.01)
H04M 1/02 (2006.01)

(52) U.S. Cl.
CPC .... *G02F 1/133394* (2021.01); *G02F 1/13338* (2013.01); *G02F 1/133317* (2021.01);
(Continued)

(58) Field of Classification Search
None
See application file for complete search history.

(56) References Cited

U.S. PATENT DOCUMENTS 10,838,241 B1 * 11/2020 Zhou ...................... H04R 17/00
2005/0025330 A1    2/2005 Saiki
(Continued)

FOREIGN PATENT DOCUMENTS

CN   1581891 A    2/2005
CN   101673013 A   3/2010
(Continued)

*Primary Examiner* — Ashok Patel
(74) *Attorney, Agent, or Firm* — Geoffrey Lottenberg; Berger Singerman LLP

(57) ABSTRACT

A liquid crystal display module and a mobile terminal are provided. Three actuators and a sound soundproofing component are disposed in a display panel; an actuator disposed between two actuators is used to generate bass, and the two actuators disposed on both sides are used to generate high pitch. An effect of low frequency vibration of the panel is improved, stereo sound of screen vibration is realized, direction of sound is improved, and privacy of customer is guaranteed.

11 Claims, 5 Drawing Sheets

(52) U.S. Cl.
CPC .. *G02F 1/133331* (2021.01); *G02F 1/133514* (2013.01); *G02F 1/133531* (2021.01); *H04M 1/0262* (2013.01); *H04M 1/0277* (2013.01)

(56) References Cited

U.S. PATENT DOCUMENTS

| | | |
|---|---|---|
| 2010/0066650 A1 | 3/2010 | Lee |
| 2020/0107125 A1 | 4/2020 | Choi et al. |
| 2021/0297758 A1* | 9/2021 | Zhou .......................... G06F 3/16 |

FOREIGN PATENT DOCUMENTS

| | | | |
|---|---|---|---|
| CN | 108124224 A | | 6/2018 |
| CN | 108513515 A | | 9/2018 |
| CN | 109492489 | * | 3/2019 |
| JP | 2008193486 A | | 8/2008 |

\* cited by examiner

LIQUID CRYSTAL DISPLAY MODULE AND MOBILE TERMINAL

CROSS-REFERENCE TO RELATED APPLICATIONS

This application is the National Phase under 35 U.S.C. § 371 of International Application No. PCT/CN2019/108915, filed Sep. 29, 2019, which claims the benefit of and priority to Chinese Patent Application No. 201910433532.7, filed May 23, 2019. The entire contents of these patent applications are hereby incorporated by reference herein.

BACKGROUND OF INVENTION

Field of Invention

The present invention relates to the field of terminals, and more particularly, to a liquid crystal display module and a mobile terminal.

Description of Prior Art

With continuous development of technology, people's requirements for electronic products have also increasingly grown. Now, full screens have become popular, but two major problems stemming from necessary components such as traditional home button, top receiver, and camera sensor block the development of screen-to-body ratio of mobile phones. Among them, the problem of the home button has now been replaced by gesture operation, while fingerprint can also be detected by screen under mobile phone or back side of the mobile phone in order to remove the top receiver. Thus, sound on display technology has been developed.

Due to simple structure, easy manufacturing, high precision, and low energy consumption of piezoelectric ceramic unit actuators, they have attracted extensive attention and research. However, the current piezoelectric ceramic sounding technology is not well developed, and there are many problems. For example, the current low frequency effect of piezoelectric ceramics is very poor, the sound direction is not good, and sound leakage easily occurs, so privacy cannot be effectively protected.

Therefore, it is necessary to provide a solution to solve the problems in the prior art.

SUMMARY OF INVENTION

A liquid crystal display module and a mobile terminal are provided to solve the problems in the prior art.

In order to solve the above problems, a liquid crystal display module includes a backlight; a lower polarizer disposed on a side of the backlight; an array substrate disposed on a side of the lower polarizer away from the backlight; a piezoelectric layer disposed on a side of the array substrate away from the lower polarizer, and the piezoelectric layer includes a plurality of actuators and at least one soundproofing component, and the at least one soundproofing component is disposed between the plurality of actuators; a color filter substrate disposed on a side of the piezoelectric layer away from the array substrate; a glass substrate disposed on a side of the color filter substrate away from the piezoelectric layer; an upper polarizer disposed on a side of the glass substrate away from the color filter substrate; a touch layer disposed on a side of the upper polarizer away from the glass substrate; and a protective glass disposed on a side of the touch layer away from the upper polarizer.

A liquid crystal display module includes an array substrate; a piezoelectric layer disposed on a side of the array substrate, wherein the piezoelectric layer comprises a plurality of actuators and at least one soundproofing component, and the at least one soundproofing component is disposed between the plurality of actuators; and a color filter substrate disposed on a side of the piezoelectric layer away from the array substrate.

In one embodiment, the liquid crystal display module further includes: a glass substrate disposed on a side of the color filter substrate away from the piezoelectric layer; an upper polarizer disposed on a side of the glass substrate away from the color filter substrate; a touch layer disposed on a side of the upper polarizer away from the glass substrate; and a protective glass disposed on a side of the touch layer away from the upper polarizer.

In one embodiment, the liquid crystal display module further includes: a backlight; and a lower polarizer disposed between the backlight and the array substrate.

In one embodiment, the liquid crystal display module further includes a first soundproofing component and a second soundproofing component respectively disposed on a leftmost side and a rightmost side of the piezoelectric layer.

In one embodiment, the plurality of actuators includes a first actuator, a second actuator, and a third actuator, which are disposed at a left, a center, and a right positions of the piezoelectric layer, respectively.

In one embodiment, the liquid crystal display module further includes a third soundproofing component disposed between the first actuator and the second actuator, a fourth soundproofing component disposed between the second actuator and the third actuator, a fifth soundproofing component disposed under the first actuator, a sixth soundproofing component disposed under the second actuator, and a seventh soundproofing component disposed under the third actuator.

A mobile terminal includes a liquid crystal display module. The liquid crystal display module includes: an array of substrate; a piezoelectric layer disposed on a side of the array substrate, and the piezoelectric layer includes a plurality of actuators and at least one soundproofing component, and the at least one soundproofing component is disposed between the plurality of actuators; and a color filter substrate disposed on a side of the piezoelectric layer away from the array substrate.

In one embodiment, the mobile terminal further includes: a middle frame provided with a first accommodation groove and a second accommodation groove; a foam covering a bottom of the first accommodation groove, and a first gap disposed between the foam and the liquid crystal display module is disposed on the first accommodation groove; a cover glass disposed on the liquid crystal display module; a battery disposed at a top of the second accommodation groove; and a back cover disposed at a bottom of the second accommodation groove.

In one embodiment, the mobile terminal further includes a first flexible printed circuit disposed in the second accommodation groove.

In one embodiment, the mobile terminal further includes a graphite disposed on the back cover, and a second gap is disposed between the graphite and the battery.

Compared with the prior art, a liquid crystal display module and a mobile terminal are provided according to an embodiment of the present invention, wherein three actuators and a sound soundproofing component are disposed in a display panel, and an actuator disposed between two actuators is used to generate the bass, and the two actuators disposed on both sides are used to generate high pitch. Effect of low frequency vibration of the panel is improved, stereo sound of screen vibration is realized, direction of sound is improved, and privacy of customer is guaranteed.

DETAILED DESCRIPTION OF PREFERRED EMBODIMENTS

Figure 1:
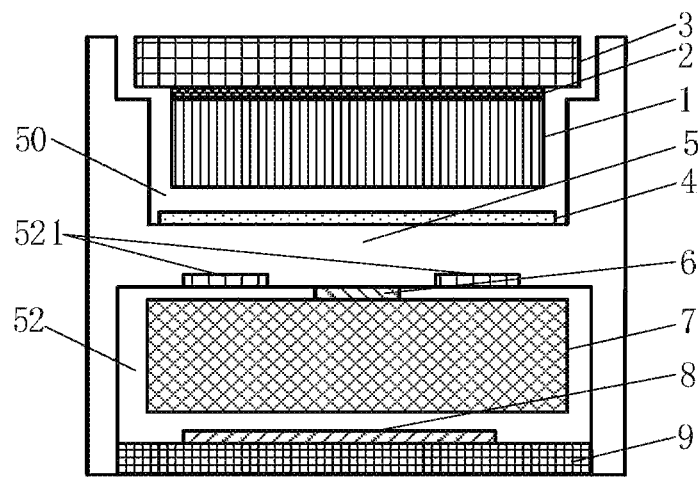
FIG. 1 is a schematic view of a mobile terminal provided according to one embodiment of the present invention.

The technical solutions in the embodiments of the present invention are clearly and completely described in the following drawings. It is obvious that the described embodiments are only a part of the embodiments of the present invention, and not all of them. All other embodiments obtained by a person skilled in the art based on the embodiments without creative efforts are within the scope of the present invention.

The terms "first", "second", "third", etc. (if present) in the specification, claims of the present invention, and the drawings are used to distinguish similar objects, and are not necessarily used to describe a particular order or prioritization. It should be understood that the described objects are interchangeable in appropriate circumstances. Moreover, the terms "comprising" and "including" and any variants thereof are intended to cover other objects.

The drawings described below and the various embodiments used to describe the principles of the present invention are intended to be illustrative only and not to limit the scope of the present invention. Those skilled in the art should understand that the principles of the present invention can be implemented in any suitably arranged system. Exemplary embodiments are described in detail, and the embodiment are illustrated in the accompanying drawings. Furthermore, exemplary embodiments are described in detail with reference to the accompanying drawings. The same reference numerals in the drawings indicate the same elements.

The terms used in the description of the present invention are only used to describe specific embodiments, and are not intended to illustrate the concepts of the present invention. Expressions used in the singular encompasses the plural forms of expression unless the context clearly dictates otherwise. In the specification of the present invention, it is to be understood that the terms such as "including", "comprising", and "having" illustrates the possibility of having features, numbers, steps, actions, or combinations thereof disclosed in the specification of the present invention. They are not intended to exclude the possibility that one or more other features, numbers, steps, acts or combinations may be added. The same reference numerals in the drawings indicate the same elements.

Referring to FIG. 1, a mobile terminal provided by the present invention includes a liquid crystal display module 1, an adhesive agent 2, a cover glass 3, a foam 4, a middle frame 5, an adhesive portion 6, a battery 7, a graphite 8, and a back cover 9.

The middle frame 5 is provided with a first accommodation groove 50 and a second accommodation groove 52. The first accommodation groove 50 and the second accommodation groove 52 are used for placing internal components of the mobile terminal. A first flexible printed circuit 521 is disposed in the second accommodation groove 52. The first flexible printed circuit 521 is electrically connected to the battery 7 so as to control the battery 7.

The foam 4 covers a bottom of the first accommodation groove 50. The foam 4 is used to protect the liquid crystal display module 1 and prevent the liquid crystal display module 1 from being damaged by vibration of the middle frame 5 during a vibration process.

The liquid crystal display module 1 is disposed in the first accommodation groove 50. A first gap is disposed between the liquid crystal display module 1 and the foam 4, which causes a piezoelectric layer 14 (FIG. 2) of the liquid crystal display module 1 to not vibrate with the middle frame 5 during the vibration process, thereby reducing energy loss and improving volume output. Moreover, if the middle frame 5 does not vibrate, it can also relieve discomfort when touching the mobile terminal, so that user experience is improved.

The cover glass 3 is disposed on the liquid crystal display module 1 through the adhesive agent 2. The adhesive agent 2 may be, but is not limited to, an optically clear adhesive (OCA). The cover glass 3 is used to protect the mobile terminal.

The battery 7 is disposed at a top of the second accommodation groove 52 through the adhesive portion 6, thereby enhancing fixity. The adhesive portion 6 may be, but is not limited to, a double-sided tape, and the battery 7 is used to provide power for the mobile terminal.

The back cover 9 is disposed at a bottom of the second accommodation groove 52. A graphite 8 is disposed on the back cover 9. The graphite 8 is used to provide heat dissipation for the mobile terminal. In addition, a second gap is disposed between the graphite 8 and the battery 7 so as to improving heat dissipation effect.

Figure 2:
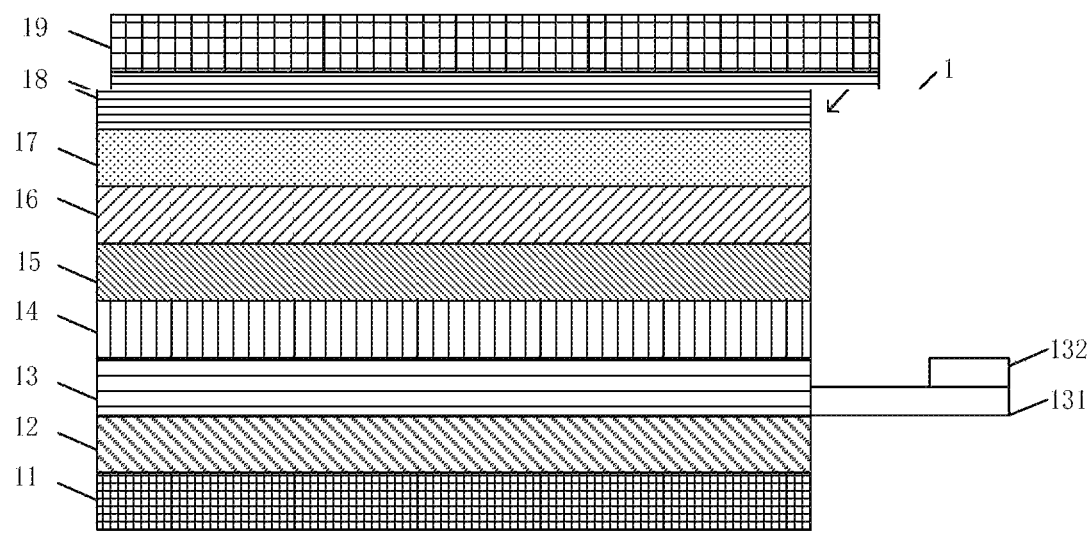
FIG. 2 is a schematic view of a liquid crystal display module according to one embodiment of the present invention.

Referring to FIG. 2, a liquid crystal display module 1 provided by the present invention includes a backlight 11, a lower polarizer 12, an array substrate 13, the piezoelectric layer 14, a color filter substrate 15, a glass substrate 16, an upper polarizer 17, a touch layer 18, and a protective glass 19.

The lower polarizer 12 is disposed between the backlight 11 and the array substrate 13. That is, the lower polarizer 12 is disposed on the backlight 11 as shown in FIG. 2.

The array substrate 13 is disposed on a side of the lower polarizer 12 away from the backlight 11. That is, the array substrate 13 is disposed on the lower polarizer 12 as shown in FIG. 2.

The array substrate 13 is bonded to a second flexible printed circuit 131, and a control chip 132 is bonded to the second flexible printed circuit 131. The second flexible printed circuit 131 and the control chip 132 are used to control component operation on the array substrate 13.

The piezoelectric layer 14 is disposed on a side of the array substrate 13. That is, the piezoelectric layer 14 is disposed on the array substrate 13 as shown in FIG. 2. The piezoelectric layer 14 includes a plurality of actuators and at least one soundproofing component, and the at least one soundproofing component is disposed between the plurality of actuators (see FIG. 3). Since the piezoelectric layer 14 is disposed in the liquid crystal display module 1, there is no need to additionally leave a position and space for the piezoelectric layer as in the case of a sounding structure of a conventional screen, so it can significantly reduce a thickness of the entire mobile terminal.

The color filter substrate 15 is disposed on a side of the piezoelectric layer 14 away from the array substrate 13. That is, the color filter substrate 15 is disposed on the piezoelectric layer 14 as shown in FIG. 2. The color filter substrate 15 is used to display colors of the liquid crystal display module 1.

The glass substrate 16 is disposed on a side of the color filter substrate 15 away from the piezoelectric layer 14. That is, the glass substrate 16 is disposed on the color filter substrate 15 as shown in FIG. 2. The glass substrate 16 is used to protect the color filter substrate 15 and its underlying components.

The upper polarizer 17 is disposed on a side of the glass substrate 16 away from the color filter substrate 15. That is, the upper polarizer 17 is disposed on the glass substrate 16 as shown in FIG. 2. The upper polarizer 17 and the lower polarizer 12 are used to convert light entering the liquid crystal display module 1 into polarized light.

The touch layer 18 is disposed on a side of the upper polarizer 17 away from the glass substrate 16. That is, the touch layer 18 is disposed on the upper polarizer 17 as shown in FIG. 2. The touch layer 18 is used to detect a touch or gesture on the liquid crystal display module 1.

The protective glass 19 is disposed on a side of the touch layer 18 away from the upper polarizer 17. That is, the protective glass 19 is disposed on the touch layer 18 as shown in FIG. 2. The protective glass 19 is used to protect the touch layer 18 and its underlying components.

Figure 7:
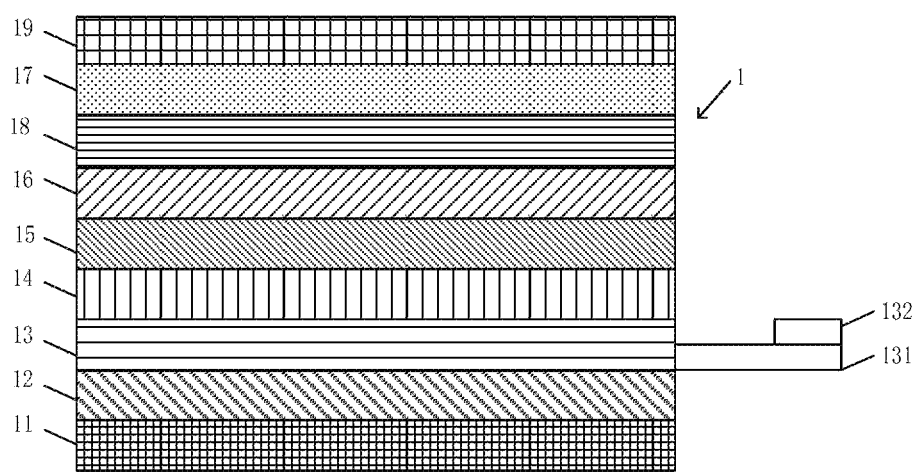
FIG. 7 is a schematic view of a liquid crystal display module according to another embodiment of the present invention.
Figure 8:
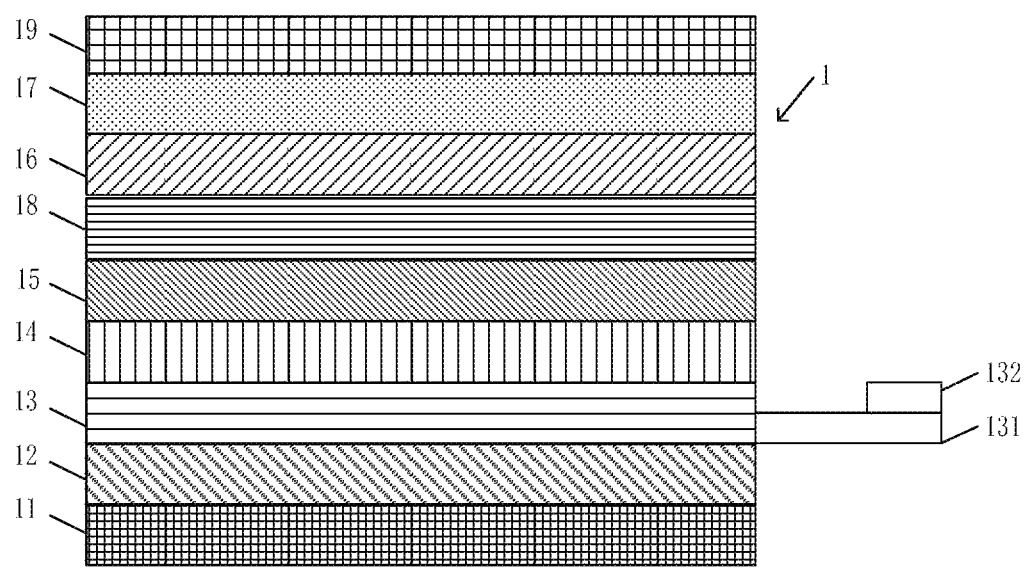
FIG. 8 is a schematic view of a liquid crystal display module according to yet another embodiment of the present invention.

Specifically, the liquid crystal display module 1 includes a display panel, and the display panel may be an organic light emitting diode (OLED) display device or a liquid crystal display (LCD). The LCD includes one glass solution (OGS) structure, on cell structure, and in cell structure. The OGS structure is that the touch layer 18 is disposed between the upper polarizer 17 and the protective glass 19 (see FIG. 2). The on cell structure is that the touch layer 18 is disposed between the glass substrate 16 and the upper polarizer 17 (see FIG. 7). The in cell structure is that the touch layer 18 is disposed between the color filter substrate 15 and the glass substrate 16 (see FIG. 8).

Figure 3:
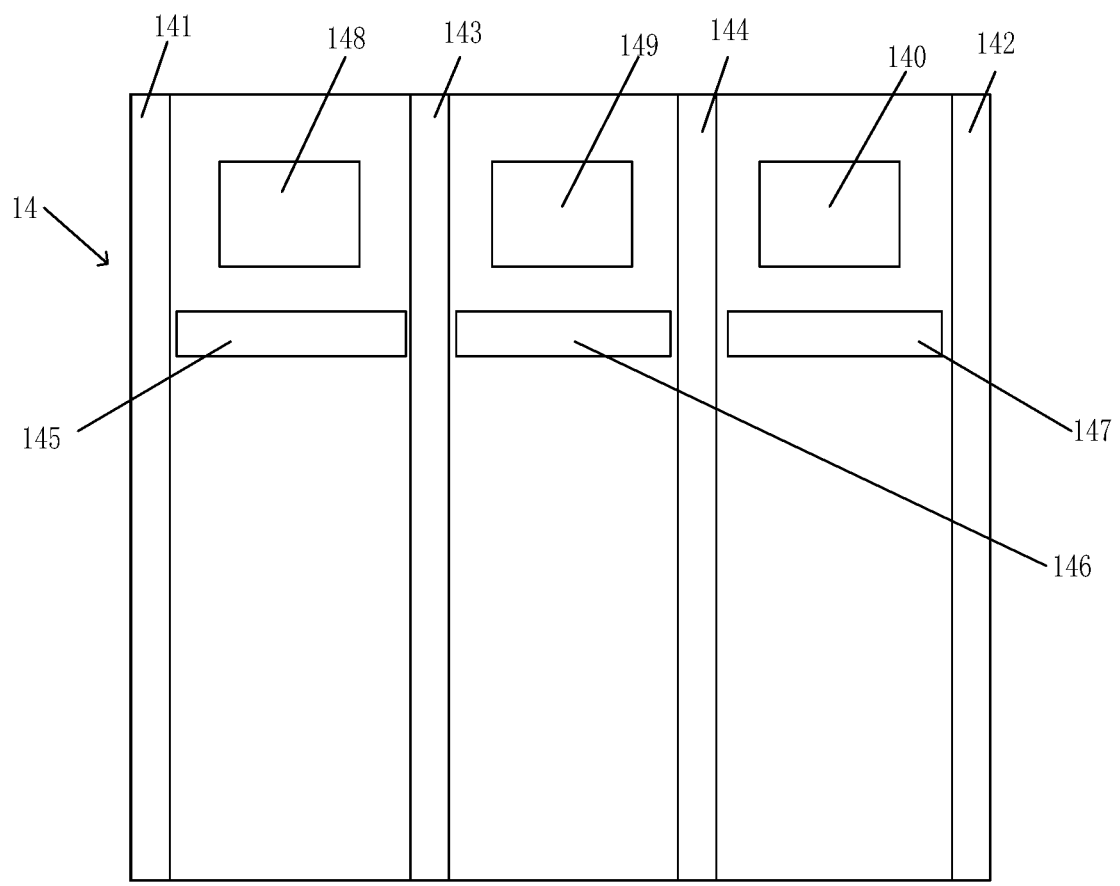
FIG. 3 is a schematic view of a piezoelectric layer according to one embodiment of the present invention.

As mentioned above, the piezoelectric layer 14 includes the plurality of actuators as shown in FIG. 3.

In one embodiment as shown in FIG. 3, the piezoelectric layer 14 includes three actuators 148, 149, and 140, disposed at a left, a center, and a right position, respectively. The left and right actuators 148 and 140 are used to generate high pitch, and the actuator 149 disposed at the center is used to generate bass, thereby improving low frequency effect of single traditional actuator. The actuators 148, 149, and 140 are piezoelectric driving actuators using piezoelectric materials such as lead zirconate titanate, aluminum nitride (AlN), or polyvinylidene fluoride (PVDF). Alternatively, the piezoelectric material may be a copolymer, but is not limited to, polyvinylidene fluoride-trifluoroethylene copolymer (PVDF-TrFE), etc.

When an alternating voltage is applied to the actuators 148, 149, and 140, the piezoelectric material of the actuators 148, 149, and 140 vibrates at a high frequency. The piezoelectric material causes the display panel of the liquid crystal display module 1 to vibrate, thereby emitting sound waves, and the sound waves are transmitted to human ear. Since the actuators 148, 149, and 140 are disposed on the array substrate, the entire liquid crystal display module 1 can be vibrated.

A first soundproofing component 141 and a second soundproofing component 142 are respectively disposed on a leftmost side and a rightmost side of the piezoelectric layer, which prevents sound waves from being transmitted from a side of the liquid crystal display panel module, and thus sound leakage can also be prevented. Also, it can reduce volume loss so as to improve volume output. Also, a soundproofing component is disposed between two adjacent actuators. That is, a third soundproofing component 143 is disposed between the first actuator 148 and the second actuator 149, and a fourth soundproofing component 144 is disposed between the second actuator 149 and the third actuator 140. Therefore, sound interference between actuators is eliminated and stereo sound is achieved, so sound quality and user experience are improved. A soundproofing component is disposed under each of the actuators 148, 149, and 140. That is, a fifth soundproofing component 145 is disposed under the first actuator 148, a sixth soundproofing component 146 is disposed under the second actuator 149, and a seventh soundproofing component 147 is disposed under the third actuator 140. Therefore, sound is unable to transmit from a lower side of the liquid crystal display module, and volume loss can be reduced so as to improve volume output.

Figure 4:
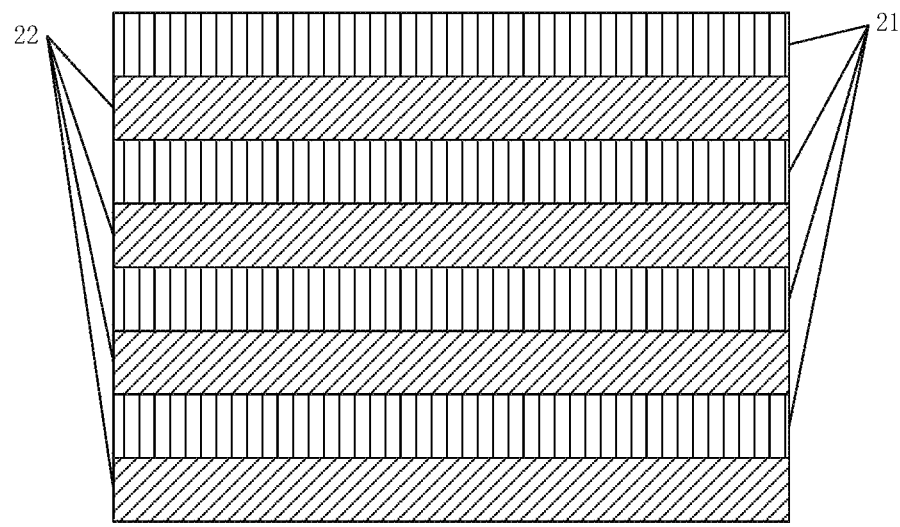
FIG. 4 is a schematic view of an actuator according to one embodiment of the present invention.

Referring to FIG. 4, the actuators according to one embodiment of the present invention adopt a multilayer piezoelectric ceramic chip. A piezoelectric material layer 21 is spaced apart from an electrode layer 22. It can perform a good vibration effect, and the vibration is relatively uniform, that is, its maximum displacement is the same, which is good for providing better-quality sound. However, it is not limited to the actuator of FIG. 4 and may include actuators having other components.

Figure 5:
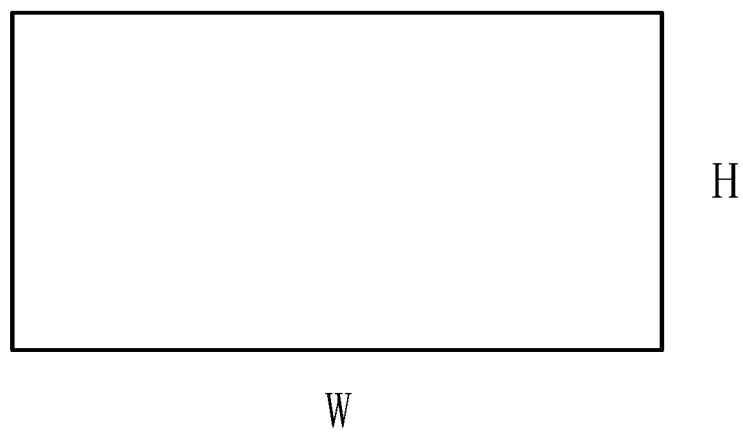
FIG. 5 is a schematic side view of a soundproofing component according to one embodiment of the present invention.

Referring to FIG. 5, it is a schematic side view of a soundproofing component according to one embodiment of the present invention. An effect of soundproofing and volume output can be adjusted by adjusting a height (H) and a width (W) of the soundproofing component. First, the height H of the soundproofing component in an uncompressed state is greater than a distance between the actuator and the color filter substrate, thereby achieving a good sealing effect. When the height (H) of the soundproof component is greater, a degree of compression is greater, thereby achieving a better sealing effect. However, when the height (H) is too great, it affects the sound output, and the sound output volume is decreased.

Moreover, the width (W) is similar to the above-mentioned principle. When the width (W) is greater, a small range of vibration is available. Thus, a better soundproofing effect is achieved, but the sound output volume is less. Generally, the height (H) is 1 mm to 100 mm and the width is 1 mm to 50 mm. Optimum H and W parameters can be selected according to the required sound quality and volume.

The height H is preferably 5 mm, 15 mm, 25 mm, 35 mm, 45 mm, 55 mm, 65 mm, 75 mm, 85 mm, and 95 mm. The width W is preferably 5 mm, 15 mm, 25 mm, 35 mm, and 45 mm.

Figure 6:
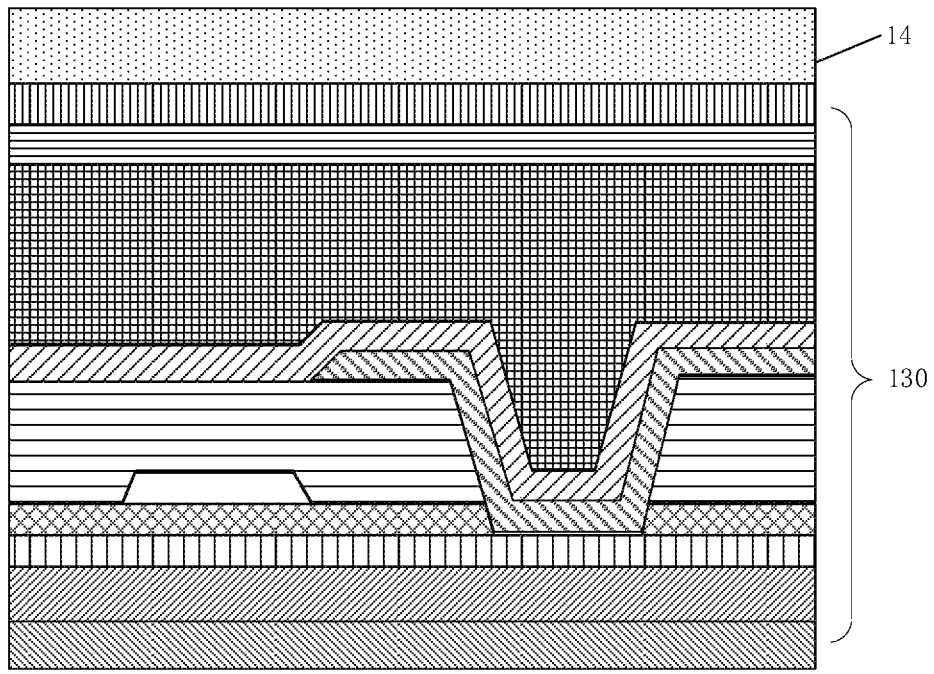
FIG. 6 is a schematic view of an array substrate and an actuator according to one embodiment of the present invention.

Referring to FIG. 6, it is a schematic view of an array substrate and an actuator according to one embodiment of the present invention. The piezoelectric layer 14 is disposed on a low temperature poly-silicon (LTPS) array substrate 130. It is to be noted that an internal structure of the low temperature polysilicon array substrate 130 is well known to those skilled in the art and is not be further described herein.

The liquid crystal display module and the mobile terminal provided by the embodiments of the present invention improve the screen-to-body ratio and the effect of low frequency vibration of the panel, thereby achieving the stereo sound of the screen vibration and improving sound directions and user privacy.

The liquid crystal display module and the mobile terminal provided by the embodiments of the present invention are described in detail. The principles and implementations of the present invention are described in the specific examples. The description of the above embodiments is only used to help understand the method of the present invention and its core idea. At the same time, for those skilled in the art, according to the idea of the present invention, there are various modifications in the specific implementation manner and the scope of present invention. Accordingly, the content of this specification should not be intended to limit the present invention.

The subject matter of the present invention can be manufactured and used in the industry with industrial applicability.

What is claimed is:

1. A liquid crystal display module, comprising:
   a backlight;
   a lower polarizer disposed on a side of the backlight;
   an array substrate disposed on a side of the lower polarizer away from the backlight;
   a piezoelectric layer disposed on a side of the array substrate away from the lower polarizer, wherein the piezoelectric layer comprises a plurality of actuators and at least one soundproofing component, and the at least one soundproofing component is disposed between the plurality of actuators;
   a color filter substrate disposed on a side of the piezoelectric layer away from the array substrate;
   a glass substrate disposed on a side of the color filter substrate away from the piezoelectric layer;
   an upper polarizer disposed on a side of the glass substrate away from the color filter substrate;
   a touch layer disposed on a side of the upper polarizer away from the glass substrate; and
   a protective glass disposed on a side of the touch layer away from the upper polarizer.

2. A liquid crystal display module, comprising:
   an array substrate;
   a piezoelectric layer disposed on a side of the array substrate, wherein the piezoelectric layer comprises a plurality of actuators and at least one soundproofing component, and the at least one soundproofing component is disposed between the plurality of actuators; and
   a color filter substrate disposed on a side of the piezoelectric layer away from the array substrate.

3. The liquid crystal display module according to claim 2, further comprising:
   a glass substrate disposed on a side of the color filter substrate away from the piezoelectric layer;
   an upper polarizer disposed on a side of the glass substrate away from the color filter substrate;
   a touch layer disposed on a side of the upper polarizer away from the glass substrate; and
   a protective glass disposed on a side of the touch layer away from the upper polarizer.

4. The liquid crystal display module according to claim 2, further comprising:
   a backlight; and
   a lower polarizer disposed between the backlight and the array substrate.

5. The liquid crystal display module according to claim 2, further comprising a first soundproofing component and a second soundproofing component respectively disposed on a leftmost side and a rightmost side of the piezoelectric layer.

6. The liquid crystal display module according to claim 2, wherein the plurality of actuators comprises a first actuator, a second actuator, and a third actuator, which are disposed at a left, a center, and a right position of the piezoelectric layer, respectively.

7. The liquid crystal display module according to claim 6, further comprising a third soundproofing component disposed between the first actuator and the second actuator, a fourth soundproofing component disposed between the second actuator and the third actuator, a fifth soundproofing component disposed under the first actuator, a sixth soundproofing component disposed under the second actuator, and a seventh soundproofing component disposed under the third actuator.

8. A mobile terminal, comprising a liquid crystal display module, wherein the liquid crystal display module comprises:
   an array of substrate;
   a piezoelectric layer disposed on a side of the array substrate, wherein the piezoelectric layer comprises a plurality of actuators and at least one soundproofing component, and the at least one soundproofing component is disposed between the plurality of actuators; and
   a color filter substrate disposed on a side of the piezoelectric layer away from the array substrate.

9. The mobile terminal according to claim 8, further comprising:
   a middle frame provided with a first accommodation groove and a second accommodation groove;
   a foam covering a bottom of the first accommodation groove, wherein a first gap is disposed between the foam and the liquid crystal display module disposed on the first accommodation groove;
   a cover glass disposed on the liquid crystal display module;
   a battery disposed at a top of the second accommodation groove; and
   a back cover disposed at a bottom of the second accommodation groove.

10. The mobile terminal according to claim 9, further comprising a first flexible printed circuit disposed in the second accommodation groove.

11. The mobile terminal according to claim 9, further comprising a graphite disposed on the back cover, and a second gap is disposed between the graphite and the battery.

* * * * *